US012738153B2

(12) United States Patent
Malhan et al.

(10) Patent No.: US 12,738,153 B2
(45) Date of Patent: Sep. 15, 2026

(54) SYSTEMS AND METHODS FOR TRAFFIC PATTERN PREDICTION THROUGH COLLABORATIVE KNOWLEDGE TRANSFERRING FROM NODE TO NODE

(71) Applicant: Denso International America, Inc., Southfield, MI (US)

(72) Inventors: Rajesh Malhan, Troy, MI (US); Mahdi Bandegi, Ann Arbor, MI (US)

(73) Assignee: DENSO International America, Inc., Southfield, MI (US)

( * ) Notice: Subject to any disclaimer, the term of this patent is extended or adjusted under 35 U.S.C. 154(b) by 138 days.

(21) Appl. No.: 18/467,756

(22) Filed: Sep. 15, 2023

(65) Prior Publication Data

US 2025/0095479 A1 Mar. 20, 2025

Related U.S. Application Data

(60) Provisional application No. 63/375,957, filed on Sep. 16, 2022.

(51) Int. Cl.
*G08G 1/01* (2006.01)
*G06N 3/044* (2023.01)
(Continued)

(52) U.S. Cl.
CPC ........... *G08G 1/0116* (2013.01); *G06N 3/044* (2023.01); *G06N 3/045* (2023.01); *G08G 1/0133* (2013.01);
(Continued)

(58) Field of Classification Search
CPC .. G08G 1/0116; G08G 1/0133; G08G 1/0112; G08G 1/04; G08G 1/042; G06N 3/044; G06N 3/045
See application file for complete search history.

(56) References Cited

U.S. PATENT DOCUMENTS 8,606,727 B2 12/2013 Wu et al.
9,582,999 B2 2/2017 Lewis
(Continued)

FOREIGN PATENT DOCUMENTS

CN 107832688 A * 3/2018 ....... H04N 21/44008
CN 111145546 B 2/2021

OTHER PUBLICATIONS

Translation of CN-107832688-A, 11 pages (Year: 2018).*
(Continued)

*Primary Examiner* — Dale W Hilgendorf
(74) *Attorney, Agent, or Firm* — Christopher G. Darrow; Darrow Mustafa PC

(57) ABSTRACT

Disclosed are systems and methods for traffic pattern prediction under abnormal behavior through collaborative knowledge transferring from node to node. In one example, a system includes a processor and a memory having instructions that cause the processor to determine vehicle traffic flows at each of a plurality of nodes using a general model that utilizes hyperparameters that derive relationships between and within each node of the plurality of nodes and observed data from sensors monitoring the plurality of nodes. The observed data includes real-world traffic data affected by hidden parameters. Using an understandable algorithm, the general model derives correlations between the hidden parameters from the observed data at multiple levels.

10 Claims, 9 Drawing Sheets

(51) Int. Cl.
*G06N 3/045* (2023.01)
*G08G 1/04* (2006.01)
*G08G 1/042* (2006.01)

(52) U.S. Cl.
CPC ............ *G08G 1/0112* (2013.01); *G08G 1/04* (2013.01); *G08G 1/042* (2013.01)

(56) References Cited

U.S. PATENT DOCUMENTS

| | | | | |
|---|---|---|---|---|
| 10,127,811 | B2 | 11/2018 | Xu et al. | |
| 10,497,259 | B2 | 12/2019 | Liu et al. | |
| 10,565,864 | B2 | 2/2020 | Benhammou et al. | |
| 10,607,480 | B2 * | 3/2020 | Israelsson | G08G 1/0116 |
| 12,327,472 | B2 * | 6/2025 | Kim | G08G 1/01 |
| 2002/0026277 | A1 * | 2/2002 | Kerner | G08G 1/0104 701/117 |
| 2012/0136561 | A1 * | 5/2012 | Barker | G08G 1/0129 701/117 |
| 2016/0225258 | A1 * | 8/2016 | Aparicio Ojea | G08G 1/097 |
| 2016/0284212 | A1 * | 9/2016 | Tatourian | G08G 1/096775 |
| 2017/0169705 | A1 * | 6/2017 | Mortazavi | G08G 1/096716 |
| 2018/0005521 | A1 * | 1/2018 | Ryu | G08G 1/095 |
| 2018/0122227 | A1 * | 5/2018 | Mubarek | G08G 1/0133 |
| 2019/0051161 | A1 * | 2/2019 | Malkes | G08G 1/015 |
| 2021/0241616 | A1 * | 8/2021 | Abdulhai | G08G 1/052 |
| 2022/0068123 | A1 * | 3/2022 | Guo | G08G 1/0112 |
| 2022/0221293 | A1 * | 7/2022 | Hara | B60W 30/143 |
| 2022/0327925 | A1 * | 10/2022 | Jackson | G08G 1/0175 |
| 2022/0391639 | A1 * | 12/2022 | Gurumurthy | G06F 18/2148 |
| 2022/0398921 | A1 * | 12/2022 | Jaggi | G08G 1/0116 |
| 2024/0371264 | A1 * | 11/2024 | Budan | G08G 1/056 |

OTHER PUBLICATIONS

Bayesian hierarchical modelling of traffic flow, Zammit et al., Proceedings of the 16th International IEEE Annual Conference on Intelligent Transportation Systems (ITSC 2013), The Hague, The Netherlands, Oct. 6-9, 2013 (Year: 2013).*

Spatiotemporal traffic prediction using Hierarchical Bayesian Modeling, Alghamdi et al (Year: 2021).*

Traffic Flow Prediction based on Deep Learning in Internet of Vehicles, Chen et al (Year: 2021).*

Alghamdi et al., "Spatiotemporal Traffic Prediction Using Hierarchical Bayesian Modeling", Future Internet, 2021, 18 pages.

Fawcett et al., "A novel Bayesian hierarchical model for road safety hotspot prediction", Accident Analysis and Prevention, 2017, pp. 262-271.

* cited by examiner

SYSTEMS AND METHODS FOR TRAFFIC PATTERN PREDICTION THROUGH COLLABORATIVE KNOWLEDGE TRANSFERRING FROM NODE TO NODE

CROSS-REFERENCE TO RELATED APPLICATION

This application claims priority to U.S. Provisional Patent Application No. 63/375,957, filed Sep. 16, 2022, and entitled "TRAFFIC PATTERN PREDICTION SYSTEM UNDER ABNORMAL BEHAVIOR THROUGH COLLABORATIVE KNOWLEDGE TRANSFERRING FROM NODE TO NODE", the contents of which are hereby incorporated by reference in its entirety.

TECHNICAL FIELD

The subject matter described herein relates, in general, to systems and methods for traffic pattern prediction.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some traffic prediction models rely on ideal traffic network conditions that ignore abnormalities, such as accidents, weather conditions, road construction, etc., often occurring under real-life conditions. Such abnormal traffic behaviors on the traffic network are an important reason existing traffic prediction models fail to accurately predict real traffic conditions. Abnormalities lead to traffic conditions that normal traffic prediction models cannot easily capture, as these are trained with traffic data that include no abnormalities.

SUMMARY

This section generally summarizes the disclosure and is not a comprehensive explanation of its full scope or all its features. Disclosed are systems and methods that provide a robust and scalable probabilistic approach based on Hierarchical Bayesian and Deep Learning models to predict traffic pattern information by transferring the knowledge of traffic patterns from node to node.

In one embodiment related to the Hierarchical Bayesian model, a system includes a processor and a memory having instructions that cause the processor to determine vehicle traffic flows at each of a plurality of nodes using a general model that utilizes hyperparameters that derive relationships between and within each node of the plurality of nodes and observed data from sensors monitoring the plurality of nodes. The observed data includes real-world traffic data affected by hidden parameters. Using an understandable algorithm, the general model derives correlations between the hidden parameters from the observed data at multiple levels.

In another embodiment related to the Deep Learning model, a system includes a processor and a memory having instructions that cause the processor to predict vehicle traffic flows at each of a plurality of nodes using a deep learning model that integrates a space and time factor of observed data from sensors monitoring the plurality of nodes, wherein the deep learning model emphasizes traffic patterns from the plurality of nodes that are neighbors.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

As mentioned, described are systems and methods that provide for a robust and scalable probabilistic approach based on Hierarchical Bayesian and Deep Learning models to predict the traffic pattern information by transferring the knowledge of traffic patterns from node to node. Generally, these nodes may represent a network of traffic intersections, wherein each node represents a different intersection. The systems and methods focus on achieving better prediction accuracy when abnormal traffic behavior occurs by transferring/adapting the knowledge of traffic patterns from node to node.

Figure 1:
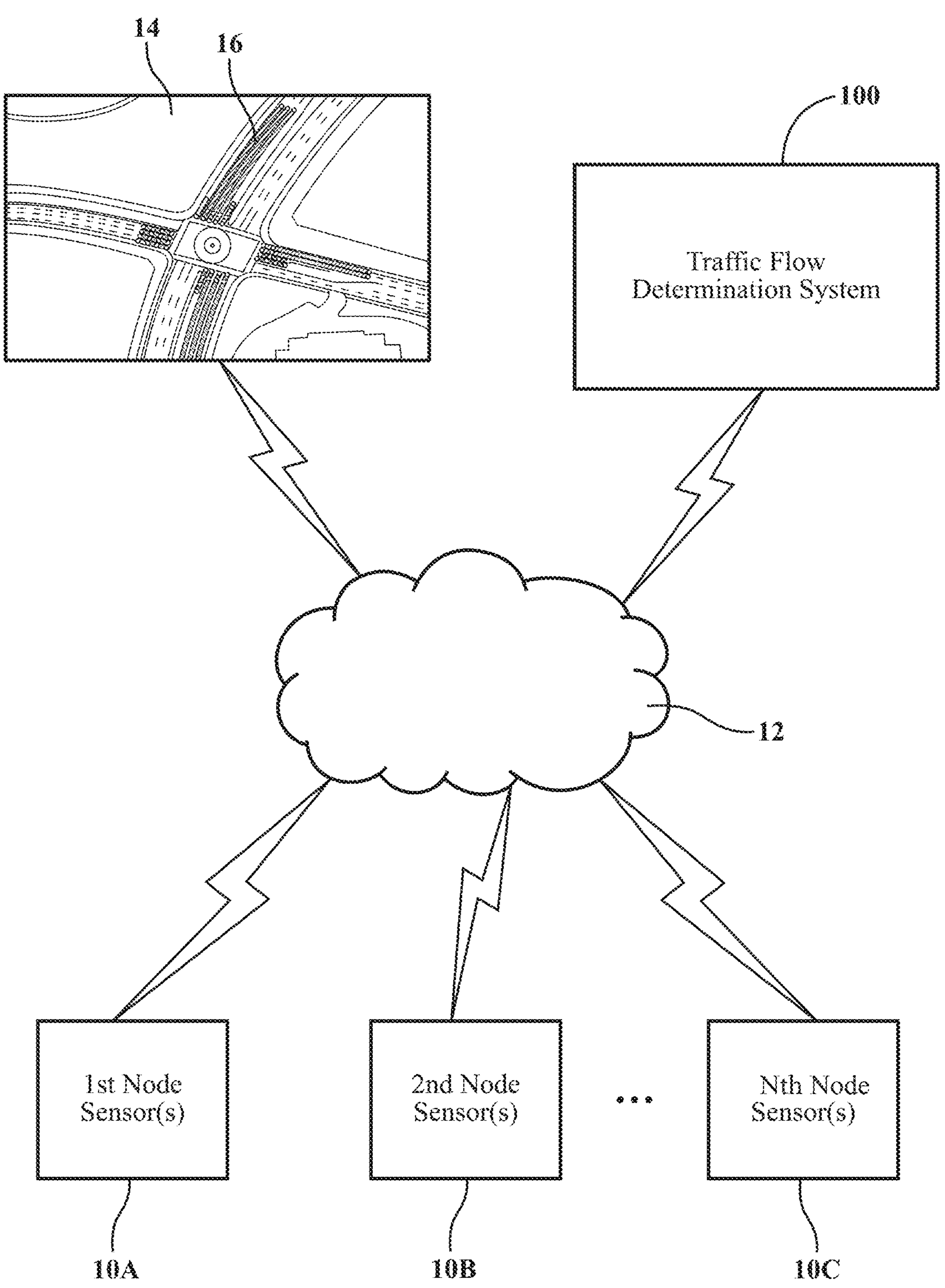
FIG. 1 illustrates an example wherein a traffic flow determination system determines traffic flows.

FIG. 1 illustrates a simplified example wherein a traffic flow determination system 100 may be utilized to determine traffic flows. As explained later, the traffic flow determination system 100 may use a mathematical algorithm or deep learning model to determine traffic flows. Generally, the traffic flow determination system 100 receives information from one or more sensor(s) 10A, 10B, and 10C capable of generating observed data observing the activities occurring at a particular node. In this example, sensor(s) 10A collect information regarding a first traffic node, sensor(s) 10B collect information regarding a second node, while the sensor(s) 10C collect information regarding an Nth node. As such, it should be understood that any number of sensors may be utilized to collect information from any number of nodes. As explained previously, each node typically represents a traffic intersection that allows the flow of traffic in multiple directions.

The sensor(s) 10A, 10B, and/or 10C can take any one of a number of different forms and combinations thereof. In one particular example, sensor(s) 10A, 10B, and/or 10C may be open-loop detectors, sometimes called inductive-loop traffic detectors, that generate open-loop detector data. Open-loop detectors can detect vehicles passing or arriving at a certain point, for instance, approaching a traffic light. An insulated, electrically conducting loop is installed in the pavement. The inductive-loop system behaves as a tuned electrical circuit in which the loop wire and lead-in cable are the inductive elements. When a vehicle passes over the loop or is stopped within the loop, some of the vehicle's ferrous body material increases the loop's inductance, causing a detection and the generation of open-loop detector data.

Of course, it should be understood that the sensor(s) 10A, 10B, and/or 10C can take other forms and combinations thereof. For example, the sensor(s) 10A, 10B, and/or 10C could be camera sensors, sonar sensors, radar sensors, light detection and ranging (LIDAR) sensors, and the like. Additionally, the sensor(s) 10A, 10B, and/or 10C may include sensors used by vehicles near the node. For example, connected vehicles may be able to collect sensor data and provide them to the traffic flow determination system 100.

In one example, the traffic flow determination system 100 receives data from the sensor(s) 10A, 10B, and/or 10C via a network 12, which may be a distributed network. The network 12 can take any one of a number of different forms and essentially acts as a conduit, allowing the transfer of information generated by the sensor(s) 10A, 10B, and/or 10C to the traffic flow determination system 100.

As will be explained in detail later, the traffic flow determination system 100 utilizes information collected from the sensor(s) 10A, 10B, and/or 10C to determine vehicle traffic flows at each node using either a mathematical algorithm or deep learning model. Other systems can then utilize these traffic flows for any one of a number of different purposes. In this example, traffic flows determined by the traffic flow determination system 100 may be used to create images 14 of visualizations 16 of the traffic flows to assist vehicle operators, pedestrians, and other road users with information regarding traveling through the nodes. Furthermore, traffic flows can be utilized by various vehicle systems, such as route generation and navigation systems and/or autonomous vehicle systems, to display route information to an operator of the vehicle and/or cause an autonomous vehicle to execute a route that was generated by considering the traffic flows calculated by the traffic flow determination system 100. In another example, traffic flows can be utilized for traffic signal management. For example, the length of time a particular traffic signal is green, red, and/or yellow can be adjusted to improve traffic flows through the particular node. Again, it should be understood that these are merely a few examples of systems that can utilize the traffic flows determined by the traffic flow determination system 100.

Figure 2:
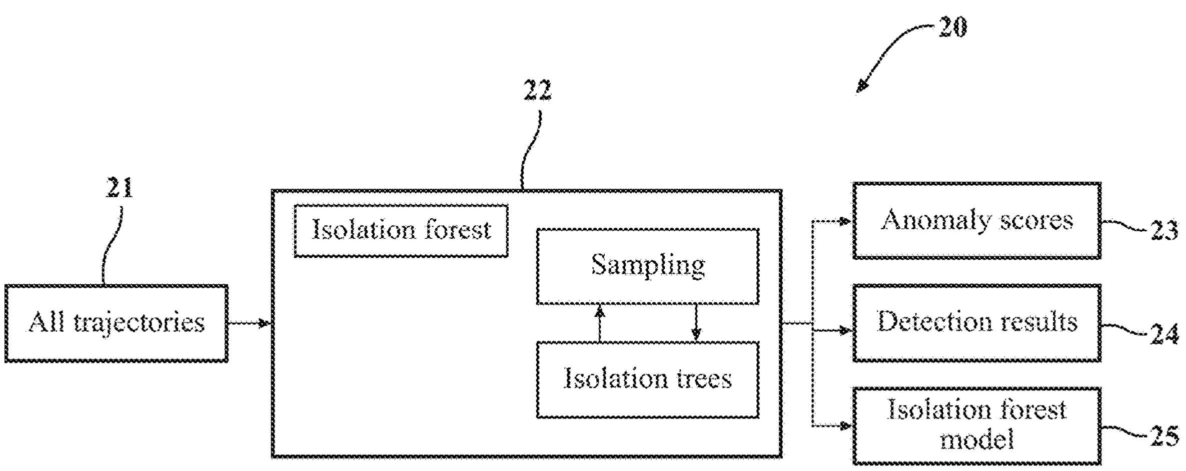
FIG. 2 illustrates a process flow for determining an anomaly at one or more nodes.

The traffic flow determination system 100 may consider the presence of abnormalities that typically lead to traffic conditions, which are generally not easily captured by prior art prediction models as they are typically trained with traffic data that includes no abnormalities. Abnormalities can be detected in any one of a number of different ways. However, one example of a process flow 20 for detecting abnormalities is shown in FIG. 2.

Figure 4:
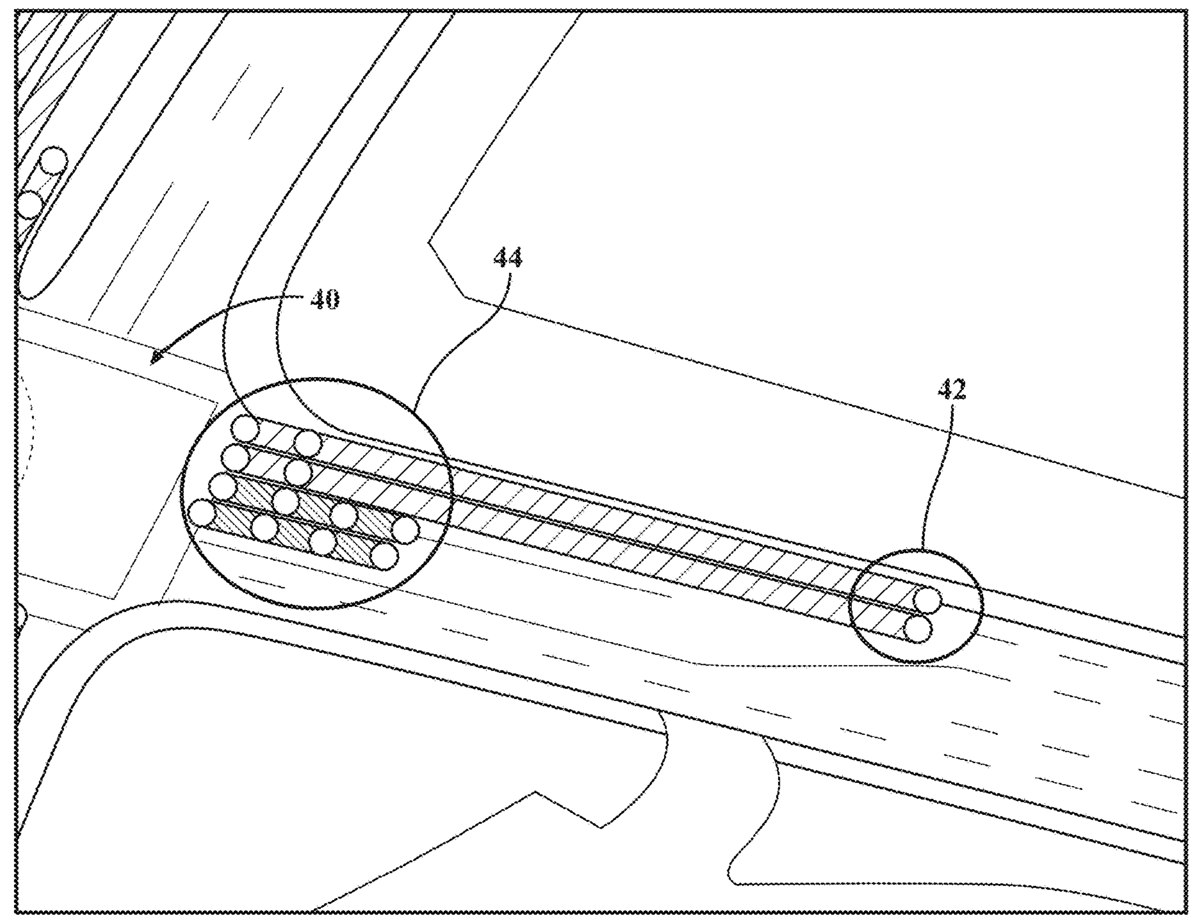
FIG. 4 illustrates an intersection with two groups of open-loop detectors.

In one example, an algorithm is utilized by the traffic flow determination system 100 to determine the number of vehicles arriving at a node (intersection) at a specific time interval using sensor information. When open-loop detectors generate the sensor information, two different kinds of open-loop detectors may be utilized to determine the number of vehicles arriving at a particular node. Moreover, FIG. 4 illustrates an intersection 40 with two groups of open-loop detectors. Advanced loop detector(s) 42 are located further from the intersection 40 and generally detect vehicles approaching the intersection 40. Stop line loop detector(s) 44 generally detect vehicles either near the intersection 40 or have crossed into the intersection 40. The difference between detections by the advanced loop detector(s) 42 and the stop line loop detector(s) 44 indicates the number of vehicles that did not pass the stop line and travel into the intersection 40. This difference indicates the presence of a queue. After the comparison has detected a queue formation, longer time intervals may be utilized to determine the queue's overall length (severity). The time interval that the difference in loop detector counts is the same provides the time that the intersection bound is cleared (i.e., no queue at that bound). This allows the traffic flow determination system 100 to systematically compute the time that a queue forms and clears at signalized intersections equipped with loop detector data. The frequency of data is important for picking the time interval.

The distance of the advanced loop detector(s) 42 may be less than 50 meters from the stop line. As such, the time that a vehicle passes the advanced loop detector(s) 42 and passes the stop line loop detector(s) 44 is less than 3 seconds in case of no traffic. Data from advanced loop detector(s) 42 and stop line loop detector(s) 44 is used to estimate the approximate individual vehicles vehicle velocity/speed. Traffic flow and headway can be computed using the stop line loop detector(s) 44 for different bounds and movements. The number of vehicles passing a detector for a specific time gives the flow and headway, which provides a measurement for comparing the node's capacity for different movements and bounds. Ultimately, traffic signal timing can be changed to make any appropriate adjustment for more efficient traffic management. This detailed traffic flow can estimate the incoming traffic for the neighboring intersections.

Referring back to FIG. 2, the process flow 20 for determining an anomaly at one or more nodes is shown. The trajectories 21, which may include location information and speed derived from information generated by the sensor(s) 10A, 10B, and/or 10C, are provided to an isolation forest model 22 that can extract abnormal and normal trajectories from all incoming trajectories for clustering by a clustering method, such as Isolation Forest. By so doing, different driving patterns are clustered in the probability of a trajectory being in each cluster, which gives the anomaly score 23. As such, the output of the isolation forest model 22 includes the anomaly score 23, the detection results 24, and the isolation forest model 25. As explained later, the anomaly score 23 and the detection results 24 may be used by the traffic flow determination system 100 to determine traffic flows at one or more nodes. The anomaly score 23 indicates abnormal behavior at a node, wherein the abnormal behavior indicates anomalous traffic volume data regarding known or unknown situations at the node.

Figure 3:
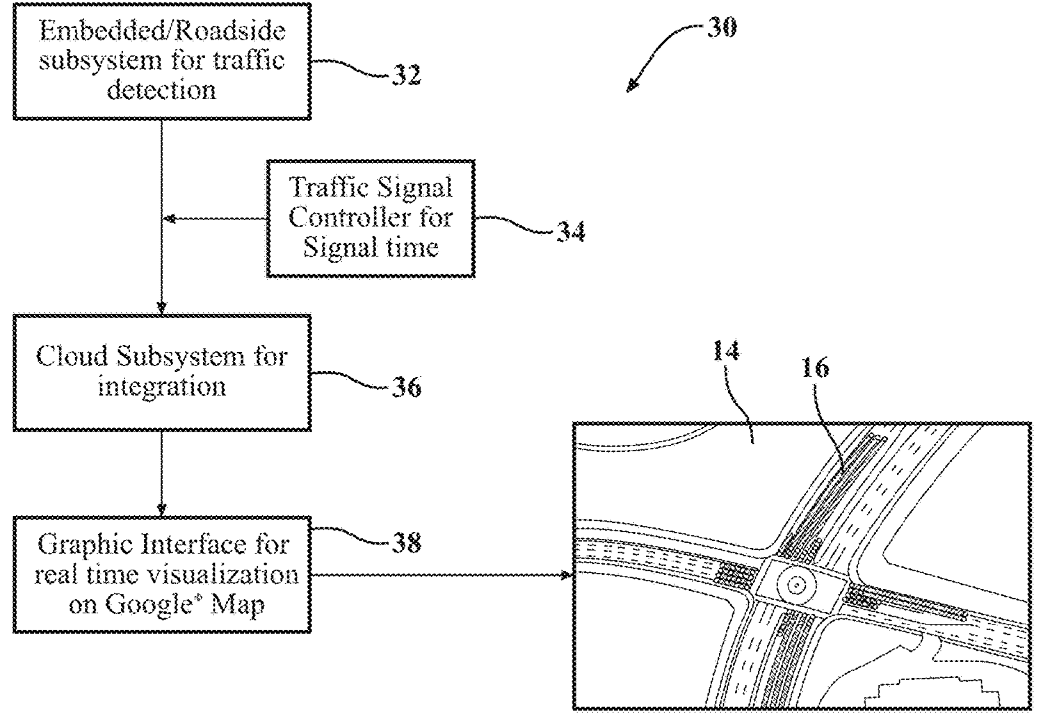
FIG. 3 illustrates a method for generating a visualization.

This information can be visualized in a number of different ways. Moreover, referring to FIG. 3, a method 30 for generating a visualization is shown. The method 30 begins at step 32, wherein loop detector data, used to make trajectory representations, is implemented in a visual map, such as Google® Maps. Step 34 matches the turn-on signal of an advance detector with the turn-on signal of the stop line detector. A cloud subsystem is used for integration, shown in step 36, and, finally, in step 38, a graphic interface for real-time visualization is shown on a Google® map, such as in image 14 as visualizations 16.

Figure 5:
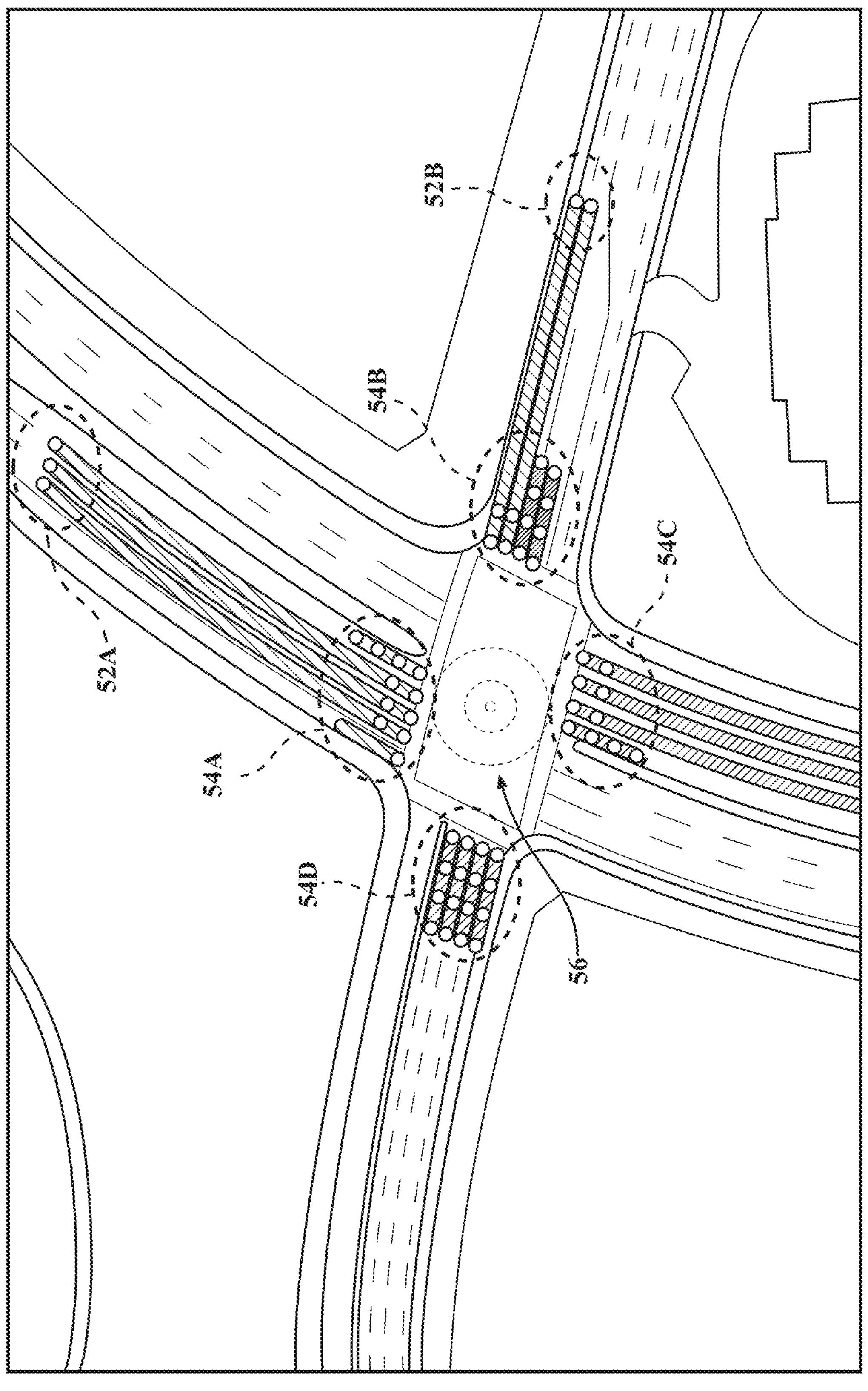
FIG. 5 illustrates examples of visualizations produced using the traffic flow determination system.

A more detailed example of the visualizations 16 is shown in FIG. 5. Here, a map shows dots 54A-54D illustrating the location of the stop line detectors at this particular node. Also illustrated are dots 52A and 52B, indicating the location of advanced detectors. Located between the stop line detectors and the advanced detectors, are bars indicating the overall severity of the formed queue. While this illustration is not in color, certain colors may be associated with less lengthy queues, such as green, and others may be associated with more lengthy queues, such as yellow/orange/red. These bars may change color in real-time to represent the change in traffic flow. Additionally, the traffic signaling information 56 may also be shown as well.

Figure 6A:
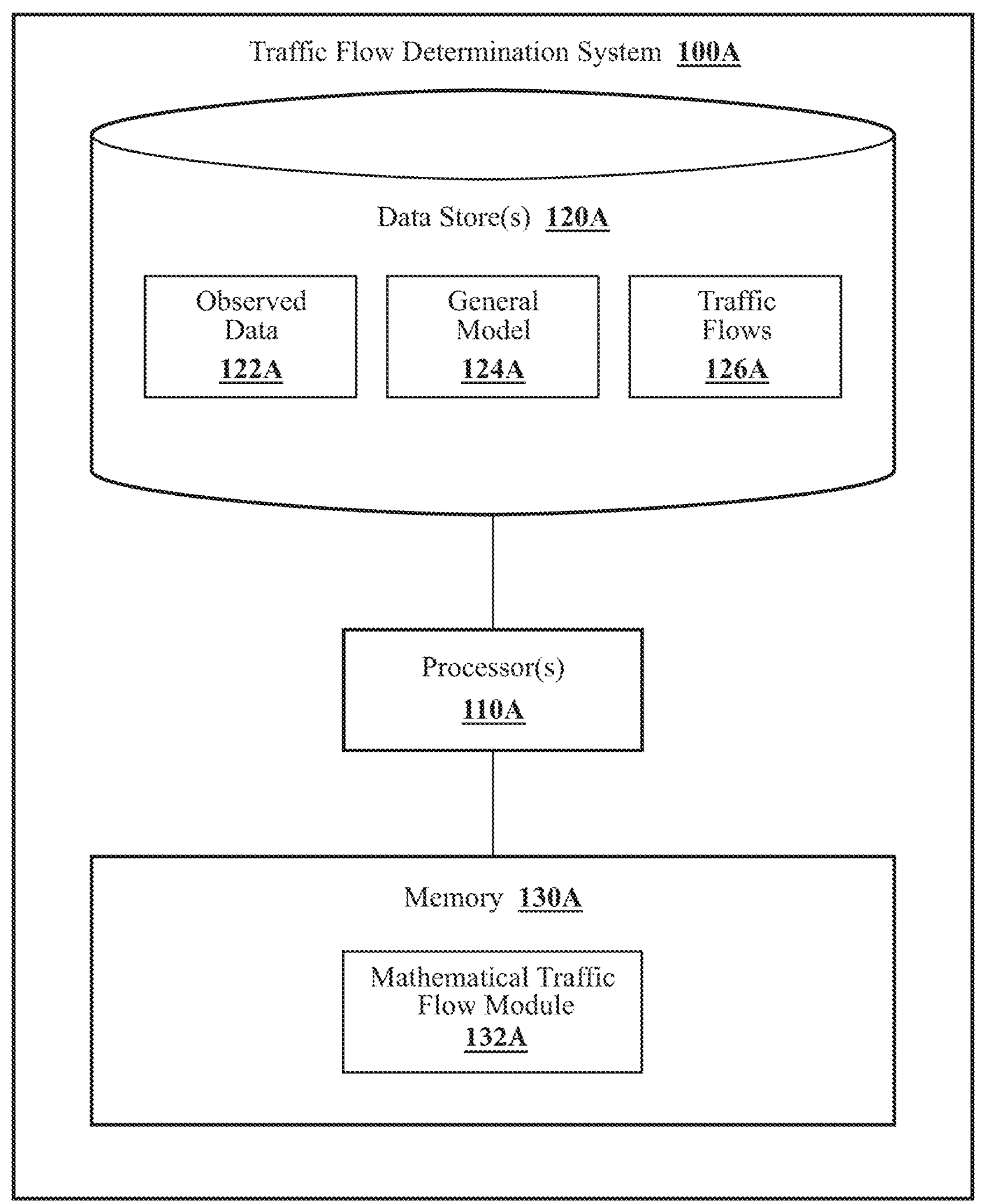
FIGS. 6A and 6B illustrate examples of systems that use the mathematical algorithm or the deep learning network, respectively, to predict traffic flows.
Figure 6B:
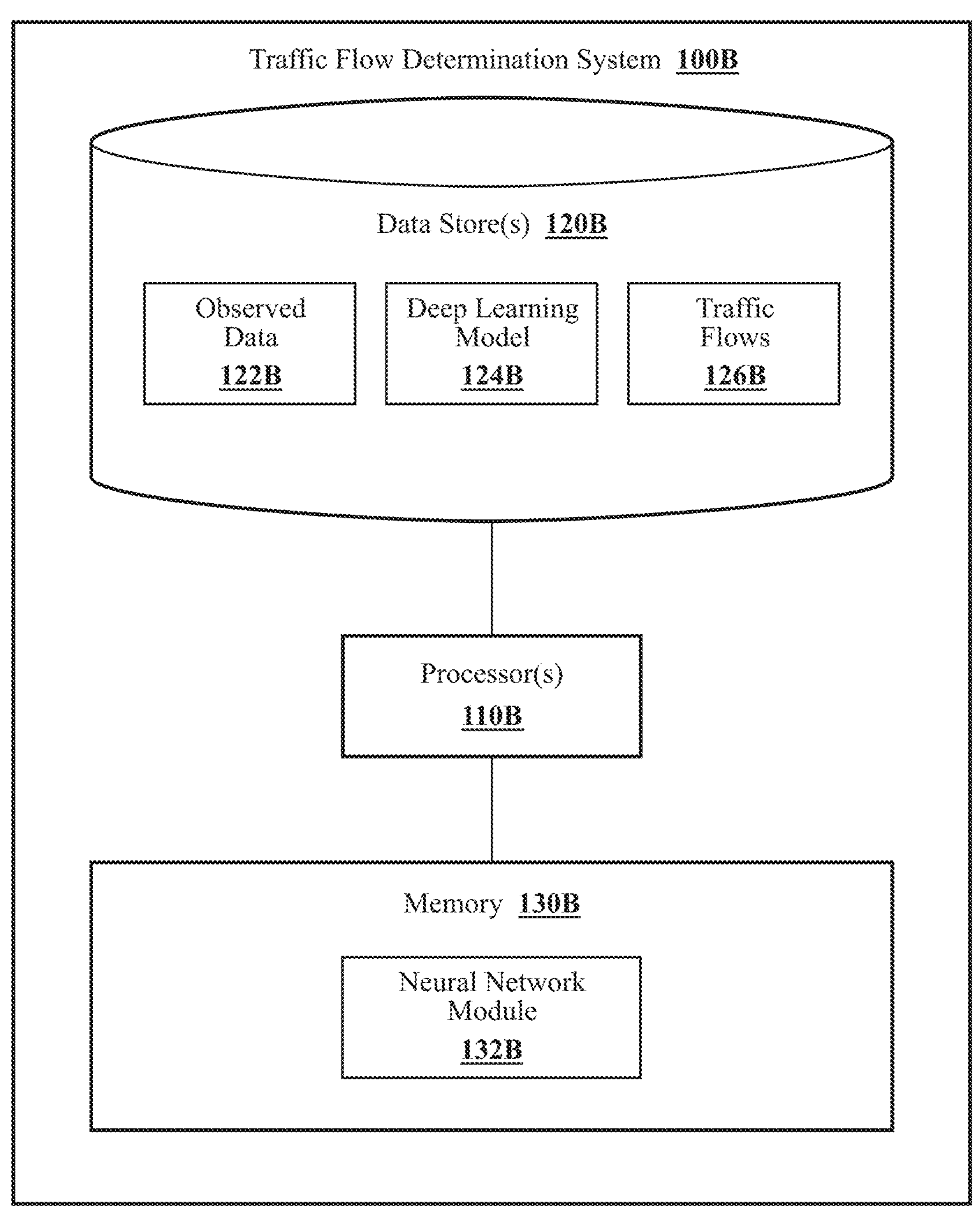

As mentioned before, the traffic flow determination system 100 can use either a mathematical algorithm or a deep learning network to predict traffic flows. FIGS. 6A and 6B illustrate examples of systems that use the mathematical algorithm or the deep learning network, respectively. For simplicity, the system that utilizes the mathematical algorithm will be described first and is shown as the traffic flow determination system 100A of FIG. 6A, while the system that utilizes the deep learning network will be described afterward.

Referring to FIG. 6A, the traffic flow determination system 100A utilizes a mathematical algorithm, such as a Hierarchical Bayesian model, to predict traffic flows. Here, the traffic flow determination system 100A includes one or more processor(s) 110A. Accordingly, the processor(s) 110A may be a part of the traffic flow determination system 100A, or the traffic flow determination system 100A may access the processor(s) 110A through a data bus or another communication path. In one or more embodiments, the processor(s) 110A is an application-specific integrated circuit that is configured to implement functions associated with a mathematical traffic flow module 132A. In general, the processor(s) 110A is an electronic processor, such as a microprocessor, capable of performing various functions described herein.

In one embodiment, the traffic flow determination system 100A includes a memory 130A that stores the mathematical traffic flow module 132A. The memory 130A may be a random-access memory (RAM), read-only memory (ROM), a hard disk drive, a flash memory, or other suitable memory for storing the mathematical traffic flow module 132A. The mathematical traffic flow module 132A is, for example, computer-readable instructions that, when executed by the processor(s) 110A, cause the processor(s) 110A to perform the various functions disclosed herein.

Furthermore, in one embodiment, the traffic flow determination system 100A includes a data store 120A. The data store 120A is, in one embodiment, an electronic data structure such as a database that is stored in the memory 130A or another memory and that is configured with routines that can be executed by the processor(s) 110A for analyzing stored data, providing stored data, organizing stored data, and so on. Thus, in one embodiment, the data store 120A stores data used and/or generated by the processor(s) 110A. In one embodiment, the data store 120A includes observed data 122A, a general model 124A, and vehicle traffic flows 126A that may be generated by the processor(s) 110A when executing the instructions stored within the mathematical traffic flow module 132A.

The observed data 122A can include any information collected by sensors, such as the sensor(s) 10A, 10B, and/or 10C and/or derived from that information. For example, the observed data 122A can include observations of events occurring at each node, such as loop detector sensor locations, number of loop detector events, loop detector order, and loop detector movement assignment. Furthermore, the observed data 122A can include information such as the anomaly score 23 previously described and shown in FIG. 2. Further still, the observed data 122A can include real-world traffic data affected by hidden parameters.

The general model 124A utilizes hyperparameters to derive relationships between and within each node and the observed data 122A from sensors monitoring the nodes. Moreover, using an understandable algorithm, the general model 124A derives correlations between the hidden parameters from the observed data at multiple levels. The hidden parameters may include distances between each of the nodes, geometrical similarity of each of the nodes, road conditions at each of the nodes, weather conditions at each of the nodes, etc.

Accordingly, the mathematical traffic flow module 132A generally includes instructions that control the processors(s) 110A to determine vehicle traffic flows 126A at each node using the general model 124A that utilizes the previously mentioned hyperparameters. The processor(s) 110A can also update the hyperparameters following computations regarding statistical models at individual nodes.

Figure 7:
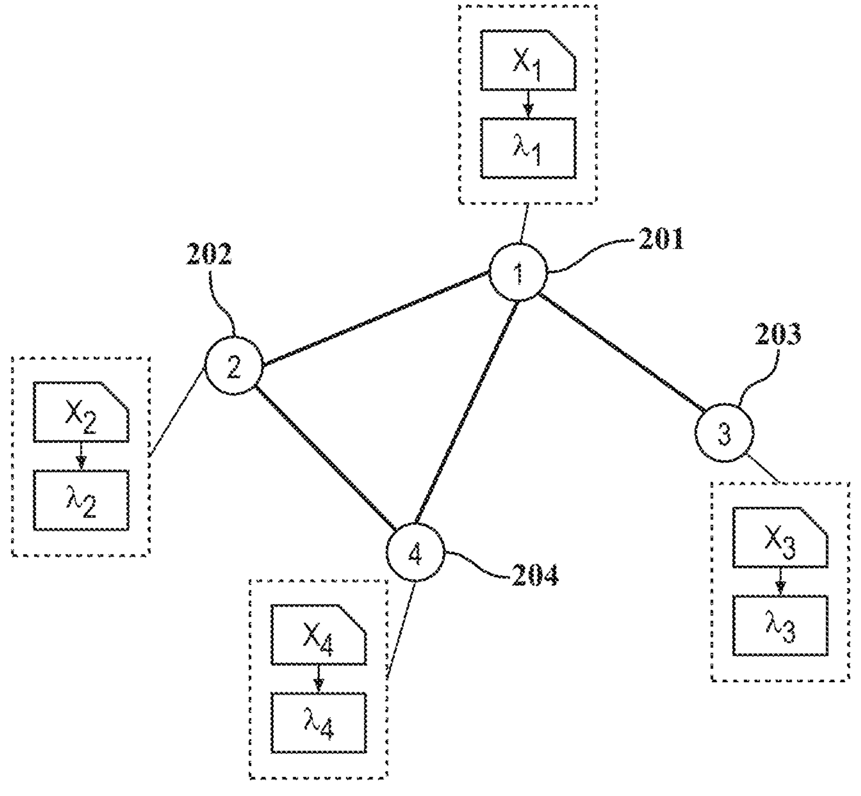
FIG. 7 illustrates four different interconnected nodes.
Figure 7:
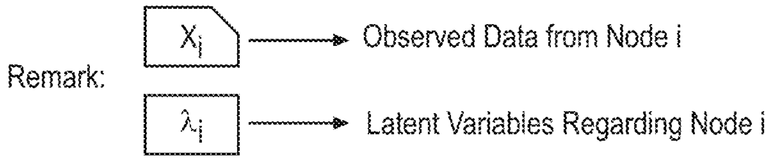
Figure 8:
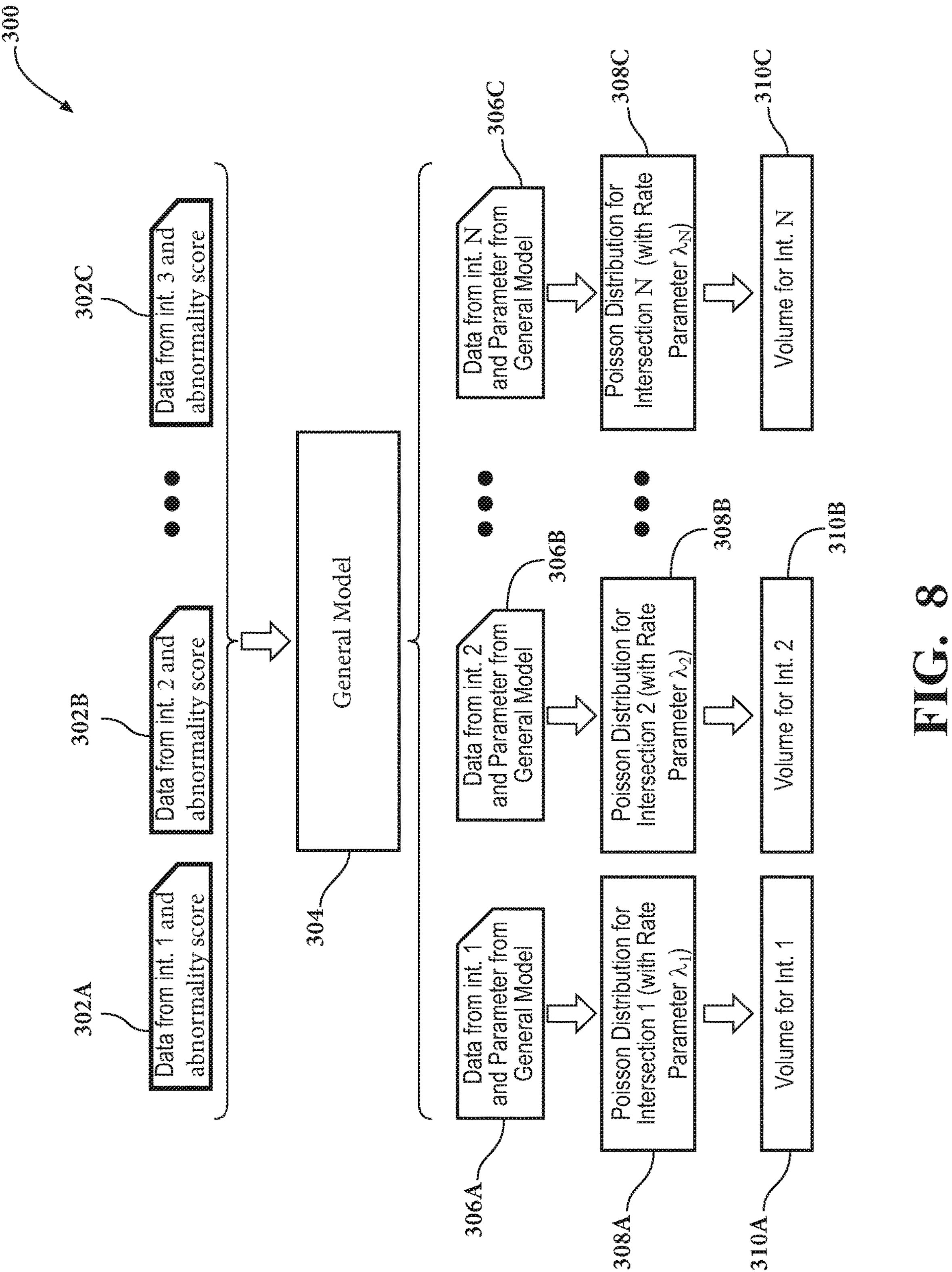
FIG. 8 illustrates a process flow to determine traffic flows at multiple intersections using a mathematical algorithm.
Figure 9:
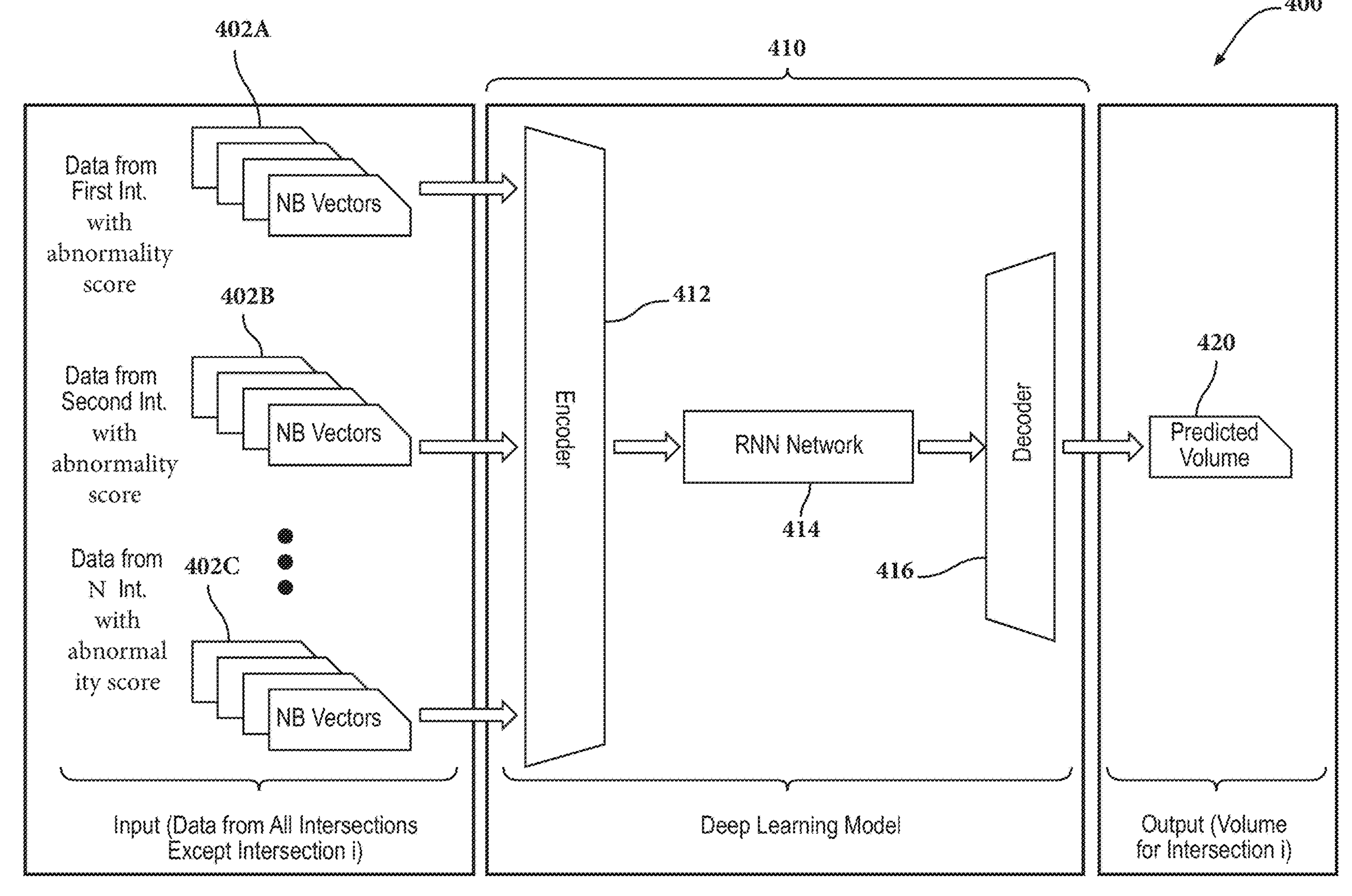
FIG. 9 illustrates a process flow to determine traffic flows using a deep learning model.

To better understand how vehicle traffic flows 126A are determined, reference is made to FIGS. 7-9. Bayesian hierarchical modeling is a statistical model written in multiple levels (hierarchical form) that estimates the posterior distribution parameters using the Bayesian method. The submodels combine to form the hierarchical model, and Bayes' theorem is used to integrate them with the observed data and account for all the present uncertainty. The result of this integration is the posterior distribution, also known as the updated probability estimate, as additional evidence on the prior distribution is acquired. The Hierarchical Bayesian model can be expressed as:

$$p(a, \theta \mid X) \propto p(X \mid \theta, a)p(\theta \mid a)p(a).$$

The Hierarchical Bayesian model utilized by the traffic flow determination system 100A considers all intersections within a region as a system. Therefore, the traffic arrival pattern at each intersection depends on traffic at all intersections. For example, FIG. 7 illustrates four different interconnected nodes 201-204, wherein each node 201-204 represents an intersection. Any number of intersections can be studied as a group, and there can be different roads connecting intersections. Each node 201-204 has associated observed data ($x_1$, $x_2$, $x_3$, $x_4$) and latent variables ($\lambda_1$, $\lambda_2$, $\lambda_3$, $\lambda_4$), respectively.

The method considers individual models for traffic arrival at each intersection, while parameter(s) at each intersection model are related to each other at a higher level. Then, a suitable model is used based on their relationship, and the parameters of the general model can be derived using the data from all intersections. This way, the information from each intersection can be transferred, while the model for each intersection can be fine-tuned based on the data acquired by that intersection. Furthermore, these models are being used for prediction.

The arrival of vehicles at the intersection is modeled as Poisson distribution with hyperparameter λ for each intersection:

$$X_i \mid \lambda_i \sim Pois(\lambda_i)\ i \in \{1, 2, \ldots, N\},$$

where N is the number of intersections to be considered as a system

The hyperparameters at each intersection are modeled as Gamma distribution with hyperparameters α, β:

$$\lambda_i \mid \alpha, \beta \sim Ga(\alpha, \beta)\ i \in \{1, 2, \ldots, N\},$$

$$\alpha = p(\alpha) \text{ and } \beta = p(\beta).$$

To better visualize this methodology, reference is made to FIG. 8, which illustrates a process flow 300. Here, observed data 302A-302C from intersections 1 . . . . N are provided to the general model to obtain the general distribution 304, which essentially describes the relationships between each intersection 1 . . . . N. As such, all data from all intersections is provided to generate the rate parameter λ.

Elements 306A-306C combine data 302A-302C and the hyperparameters α, β obtained from the general distribution 304. Poisson distributions 308A-308C for each of the intersections (i.e., rate parameters $\lambda_1$, $\lambda_2$, $\lambda_N$) are then obtained, which are then used to determine the traffic flow volumes for 310A-310C for each intersection 1 . . . . N. After that, rate parameters $\lambda_1$, $\lambda_2$, $\lambda_N$ can then be used to update the general model. As such, multiple levels impact the ability to determine traffic flow volumes for 310A-310C for each intersection 1 . . . . N. The general distribution generated by the general model is used to create Poisson distributions for each intersection, which can then be used to update the general distribution.

As mentioned previously, the traffic flow determination system 100A of FIG. 6A determines traffic flows utilizing a mathematical model. However, the traffic flow determination system 100B of FIG. 6B takes a different approach and utilizes a deep learning model that may be trained in a supervised fashion. Moreover, referring to FIG. 6B, it should be understood that any prior description of similar elements when describing the traffic flow determination system 100A of FIG. 6A applies equally to the traffic flow determination system 100B of FIG. 6B. As such, for example, prior descriptions regarding the processor(s) 110A, the data store 120A, and the observed data 122A of the traffic flow determination system 100A of FIG. 6A applies equally to the processor(s) 110B, the data store 120B, and the observed data 122B of the traffic flow determination system 100B of FIG. 6B. As such, those descriptions will not be repeated again.

However, the traffic flow determination system 100B of FIG. 6B includes a deep learning model 124B that determines the traffic flows 126B with the observed data 122B acting as an input to the deep learning model 124B. Furthermore, the memory 130B includes instructions stored within a neural network module 132B that cause the processor to determine the traffic flows 126B using the deep learning model 124B and the observed data 122B.

Referring to FIG. 9, one example of a process flow 400 for obtaining traffic flows using the deep learning model 124B is shown. Here, observed data 402A-402C from intersections 1 . . . . N are provided to the deep learning model 410 (which is similar to the deep learning model 124B of FIG. 6B). The observed data 402A-402C can include any information collected by sensors, such as the sensor(s) 10A, 10B, and/or 10C and/or derived from that information. For example, the observed data 402A-402C can include observations of events occurring at each node, such as loop detector sensor locations, number of loop detector events, loop detector order, and loop detector movement assignment. Furthermore, the observed data 402A-402C can include information such as the anomaly score 23 previously described and shown in FIG. 2. Furthermore, the observed data 402A-402C can include real-world traffic data affected by hidden parameters.

In one example, the deep learning model 410 may include an encoder 412, a recurrent neural network (RNN) 414, and a decoder 416. The RNN 414 is a type of artificial neural network that uses sequential data or time series data and utilizes training data to learn in a supervised fashion. However, it should be understood that the deep learning model 410 may be constructed differently and utilize other types of neural networks. It should not be construed as being limited to just RNNs. Using the observed data 402A-402C as inputs, the RNN 414 can effectively consider the temporal aspect of the observed data 402A-402C and predict volume 420 for any individual intersection by implementing the importance of time and space in observed data 402A-402C. For example, if the time domain is x minutes, the number of vectors from each bound of that intersection is x times the number of loop detectors at that bound of the intersection.

As such, the systems and methods disclosed herein are robust and scalable probabilistic approaches based on Hierarchical Bayesian or Deep Learning Models to accurately predict traffic under normal and abnormal traffic behavior conditions. Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. Each block in the flowcharts or block diagrams may represent a module, segment, or portion of code comprising one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or apparatus adapted for the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk™, C++, or the like, and conventional procedural programming languages, such as the "C" programming language or similar programming languages. The program code may execute entirely on the user's computer, partly on the user's computer, partly on a stand-alone software package, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor; and a memory in communication with the processor, the memory having a mathematical traffic flow module with instructions that, when executed by the processor, cause the processor to:

determine vehicle traffic flows at each of a plurality of nodes using a hierarchical Bayesian general model in which node-level traffic arrivals are modeled by a Poisson distribution with a Gamma distribution modeling hyperparameters ($\alpha$, $\beta$) that link parameters between and within each node of the plurality of nodes and observed data from sensors monitoring the plurality of nodes, wherein the observed data includes real-world traffic data affected by hidden parameters, the hidden parameters comprising road geometry and weather conditions, and wherein the hierarchical Bayesian general model computes posterior distributions over the hidden parameters to derive correlations across multiple hierarchical levels and updates the hyperparameters ($\alpha$, $\beta$) based on data received from the plurality of nodes; and based on the vehicle traffic flows, control at least one of a traffic signal and an autonomous vehicle system.

2. The system of claim 1, wherein the hidden parameters further include one or more distances between each of the plurality of nodes, geometrical similarity of each of the plurality of nodes, and road condition at each of the plurality of nodes.

3. The system of claim 1, wherein the mathematical traffic flow module further comprises instructions that, when executed by the processor, cause the processor to update the hyperparameters following computations regarding statistical models at individual nodes.

4. The system of claim 3, wherein the mathematical traffic flow module further comprises instructions that, when executed by the processor, cause the processor to model the vehicle traffic flow at each of the plurality of nodes using the observed data.

5. The system of claim 1, wherein:

the observed data includes observations of events occurring at each node; and the observed data includes at least one of loop detector sensor locations, number of loop detector events, loop detector order, and loop detector movement assignment.

6. The system of claim 1, wherein the observed data further includes an anomaly score for each of the plurality of nodes, the anomaly score indicating abnormal behavior at a node.

7. The system of claim 6, wherein the abnormal behavior indicates anomalous traffic volume data regarding known or unknown situations.

8. The system of claim 1, wherein the sensors include one or more of open loop detectors, camera sensors, radar sensors, and sonar sensors.

9. The system of claim 1, wherein the observed data includes data collected from vehicles located near the plurality of nodes.

10. The system of claim 1, wherein at least one of the plurality of nodes is an intersection.

* * * * *